March 14, 1944.

D. H. WASHBURN 2,344,225

STRIP LOOPING DEVICE

Filed Jan. 6, 1942

INVENTOR.
DONALD H. WASHBURN.
BY Allen & Allen
ATTORNEYS.

March 14, 1944. D. H. WASHBURN 2,344,225
STRIP LOOPING DEVICE
Filed Jan. 6, 1942  3 Sheets-Sheet 3

INVENTOR.
DONALD H. WASHBURN.
BY Allen & Allen
ATTORNEYS.

Patented Mar. 14, 1944

2,344,225

UNITED STATES PATENT OFFICE 2,344,225

STRIP LOOPING DEVICE

Donald H. Washburn, Middletown, Ohio, assignor to The American Rolling Mill Company, Middletown, Ohio, a corporation of Ohio Application January 6, 1942, Serial No. 425,806

12 Claims. (Cl. 271—2.1)

Various treatments which are practiced upon sheet metal, including, but without limitation, pickling, annealing, coating with molten metals such as zinc, tin, or terne, are more advantageously carried on in a continuous manner, which requires that individual pieces of sheet metal, whether of sheet length or longer, be attached together to form a continuous strip. Further, in many of these operations speeds of travel of a continuous strip of three hundred feet per minute or more are desired. The joining of the ends of sheets or strips may be done by a number of conventional methods such as by spot-welding, butt-welding, stitching, riveting and the like. All of these methods, however, make it necessary that the trailing end of the continuous strip be held stationary for at least a length of time necessary for the joining of the pieces. In many such operations, where coiled strips are joined to form the continuous supply, it is necessary to hold the trailing end of the continuous supply stationary while the next coil is placed in a decoiling device and its end brought up to the trailing end of the supply. Many operations will require preparation of the ends of the strip and supply for welding as by shearing and clamping, and these operations also take time. In order to have the continuous supply continue through the processing units without stoppage, some means must be provided which will store an extra length of strip and pay the strip out during those intervals when strip ends are being joined one to another.

These means have hitherto been provided in various forms. There have been provided looping pits into which loose loops of strip are run before the trailing end of the continuous supply is stopped. There have been provided looping devices for arranging a storage supply of the strip in vertically standing loops. There have been horizontal looping systems in which a pulley or drum is mounted upon a movable car which is used to pull out a loop. All of these expedients have certain disadvantages. Most of them take up a very considerable amount of floor space. In many of them also, it is a disadvantage that the several lengths of strip in the loop lie and move against each other, producing scratches, or that the surface of the looped strip may be scratched by being dragged across other surfaces.

It is an object of my invention to provide a looping means in which these disadvantages are eliminated. It is an object of my invention to provide a horizontal looper which can be so located as to take up very little floor space while making provision for the storage of any desired length of strip. It is an object of my invention to provide a horizontal looper which has means for supporting the upper length of the strip forming the loop in such a way that catenary sag is prevented, and in such a way as to prevent the upper stretch of the loop from contacting with and scratching or becoming scratched by the lower length of the strip or by the apparatus of the looper. It is an object of my invention to provide a looper which, having the advantages set forth above and others which will be made clear hereinafter, is nevertheless relatively inexpensive to construct, simple to operate and adapted to the formation of a continuous supply of strip metal for any desired processing treatments substantially without regard to available floor space.

These and other objects of my invention which will be set forth hereinafter or will be apparent to one skilled in the art upon reading these specifications, I accomplish by that arrangement of parts of which I shall describe an exemplary embodiment.

Reference is made to the drawings in which.

The treatment apparatus with which my looper may be used can be widely varied and the showing of treatment apparatus herein is exemplary merely of one field of usefulness for my structure and is not a limitation on the claims herein made.

Figure 1:
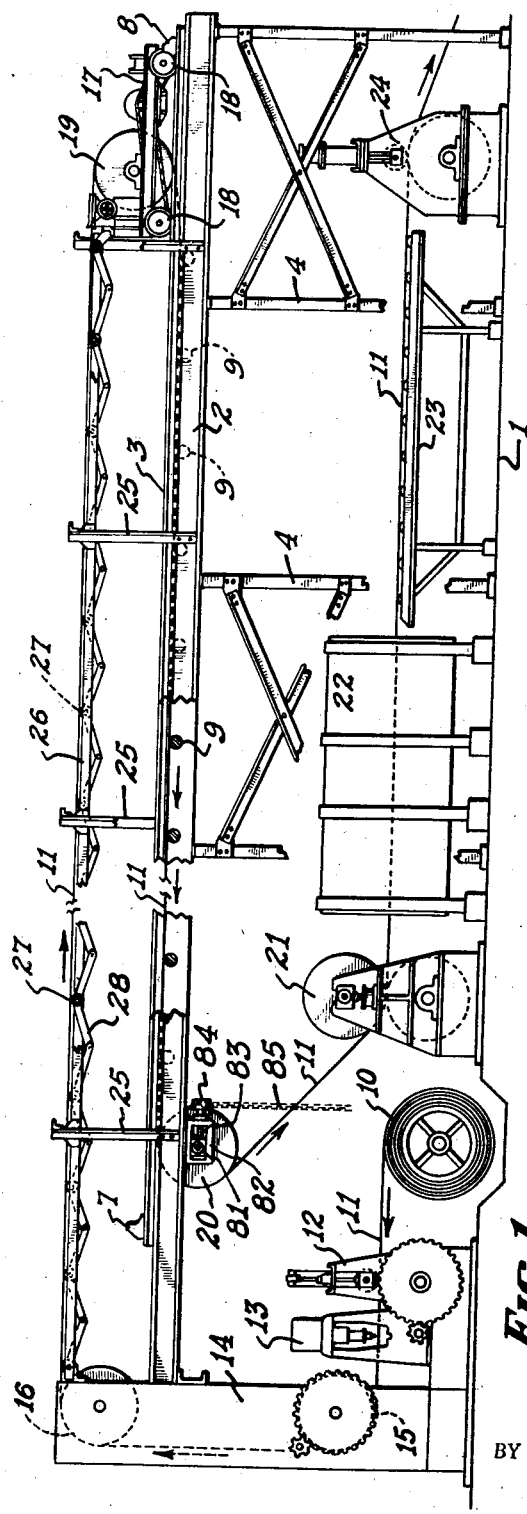
Figure 1 is a side elevation with certain parts in section of a looper installation in combination with various treatment elements.
Figure 2:
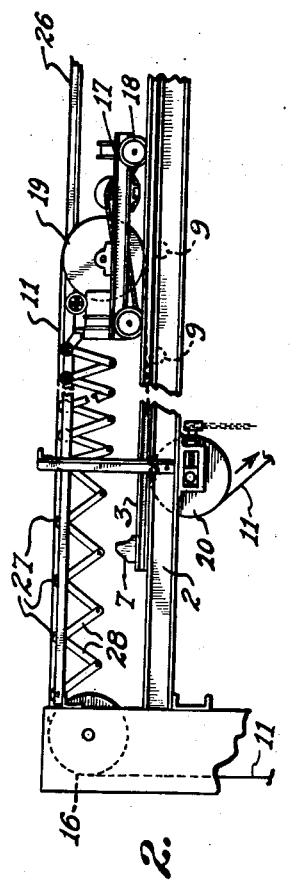
Fig. 2 is a partial side elevation of the looper device with the car in a retracted position.

In Fig. 1 I have shown, mounted upon a floor 1, an overhead track frame 2 which may be made as long as desired and in practice will be substantially half the length of the desired quantity of strip to be stored to permit continuous movement. This trackway may be in the form of a frame of iron beams or the like, upon which the actual tracks 3 are mounted. The structure may be supported at intervals by braced frame supports 4. The supporting of the main track above the floor 1 leaves almost the entire floor space usable for other treatment apparatus as will be clear.

At each end of the tracks 3, I may provide a stop 7 or 8 serving to limit motion of a car or carriage which will be mounted upon the tracks. Between the side beams 2 of the trackway I mount, at intervals, a plurality of anti-frictional rollers 9, the purpose of which is to support the lower flight or length of the strip in the loop. These rollers are closely enough spaced to prevent any substantial sag of the strip. They also are mounted low enough so that they do not interfere with the passage of the carriage aforementioned.

I have shown mounted on the floor a decoiling device 10, diagrammatically indicated. The strip 11 may be decoiled at 10, and may be passed through power pinch rolls 12, for pulling the strip from the decoiler and for positioning the end of the strip under the welding device. A shear may be added before or after the pinch roll for squaring the end of the strip. A welding device 13 joins the strip end onto continuous supply. In an end frame 14, which may be employed to support one end of the track arrangement, I mount a pair of drums 15 and 16. The strip 11 passes beneath the lower drum, is carried vertically upwardly and passes over the upper drum.

On the trackway 3, I mount a carriage 17 supported by suitable flanged wheels 18 engaging the track. On this carriage, there is mounted a drum 19 over which the strip passes. This drum serves to reverse its direction, and the strip is carried back along the length of the trackway to a stationary drum 20 which may be mounted near the end standard of frame 14. I have thereafter shown the strip being carried downwardly and through a pair of driven pinch rolls 21. In succession the strip, as shown, is passed through an annealing furnace 22 of elongated type, over an operating or inspection table 23 and through another pair of power pinch rolls 24. I am currently using my looper in connection with apparatus for coating the strip with terne metal in which an initial heat treatment has been found to be of advantage. From the right hand end of Fig. 1, the strip passes in this way to various means for cleaning it and coating it with molten metal.

It is essential that the strip in its upper flight or length in the looper be supported in such a way that it will not be permitted to sag and scratch the lower length of the strip in the loop. At intervals along the trackway, I provide standards or supports 25 which support an upper trackway 26. This trackway may be formed of angle irons as will be set forth hereinafter. A series of supporting rollers for the upper flight of the loop are provided as at 27. These rollers are mounted on flanged wheels at their ends, which wheels ride on the track members 26. The rollers 27 are connected together by spacing arms 28, the mode of operation of which will be outlined hereinafter. The arms, however, function to maintain a suitable spacing of the rollers 27 irrespective of the position of the carriage 17. It is to be understood, of course, that the carriage 17 is movable along the trackway 3. In moving to the right it takes up strip, and pays it out as it moves to the left, thus furnishing a means for the storage of sufficient strip to permit continuous movement of the supply.

It will be understood that after the leading end of a coil or strip, being decoiled at 10, is joined to the trailing end of the continuous supply, the strip may be decoiled at a rate faster than the movement of the continuous supply through treatment apparatus such as 22. And thus, the carriage 17 may be moved to the left in Fig. 1 in spite of the continuous travel of the strip, so as to store up a portion of the continuous supply. When the entering strip is completely decoiled at 10, its trailing end, which is now the trailing end of the continuous supply, may be clamped. The supply continues to move through the treatment apparatus, which is permitted by the movement of the carriage 17 to the left in Fig. 1, thus paying out the stored strip. During this paying out process, an additional coil is moved into position at 10, and joined to the trailing end of the continuous supply. During the succeeding rapid decoiling operation, the carriage 17 again moves to the right as will be understood.

Figure 3:
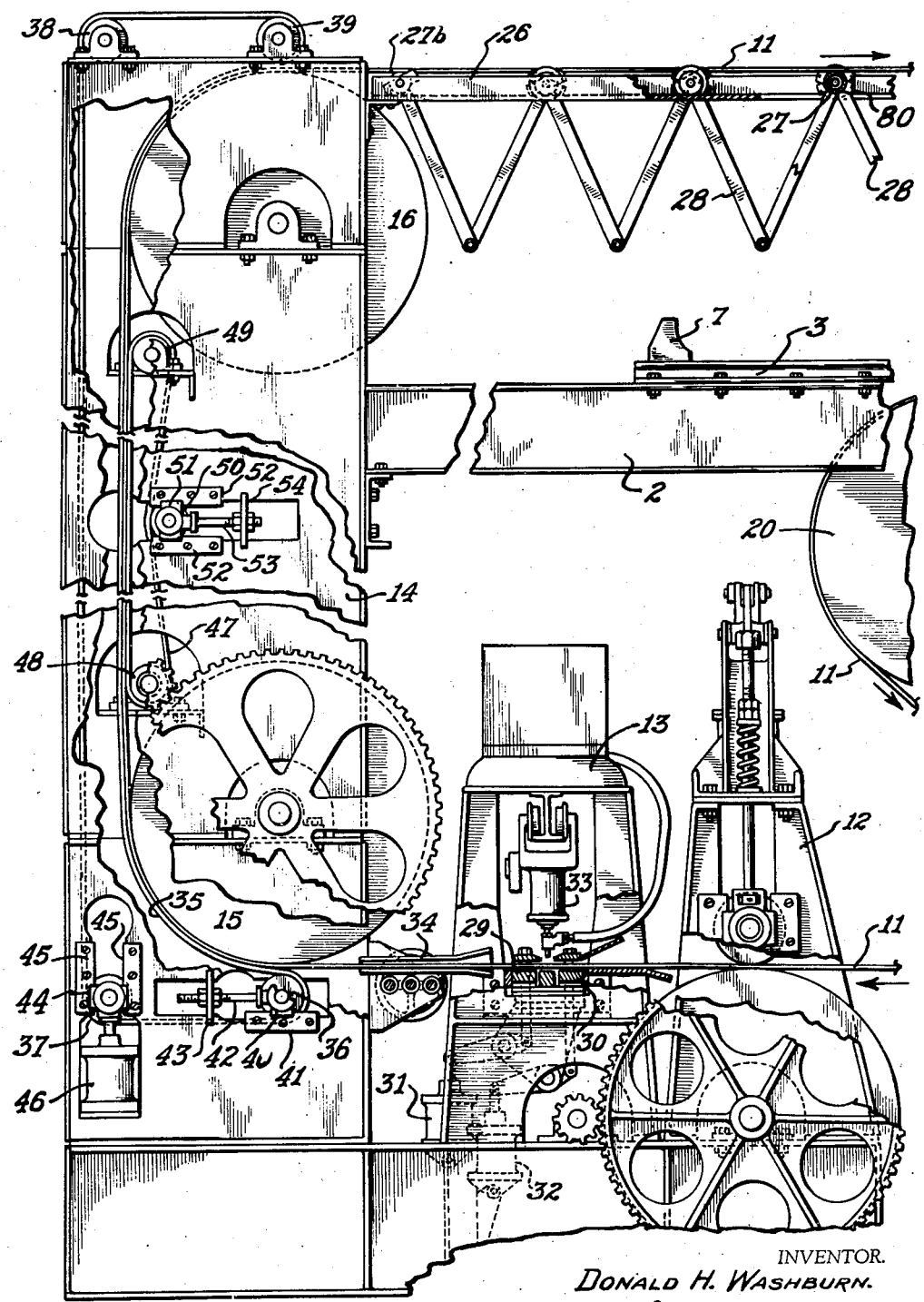
Fig. 3 is an elevational view with parts in section and on an enlarged scale, of the entering end of my looper device.

For details of construction, reference is now made to Fig. 3. The welding means in the exemplary embodiment is shown as having a pair of welding clamps 29 and 30 which may be actuated by fluid pressure cylinders 31 and 32. The fluid clamp 29, may be employed to lock the trailing end of the continuous supply of strip during such time as the looper is operating as a pay out device. The welder has suitable welding means 33 which may be a torch device, electric arc means, a continuous welder, a spot welder, or where the nature of the treatment operations permit, it may be changed to a stitching or riveting device. In any event, it is usually mounted on a traverse carriage as shown, so as to operate successively across the width of the strip material.

The strip material preferably goes through guide means 34. Suitable guide means for this purpose will hereinafter be set forth in connection with the description of Fig. 6. The strip is held to the surface of the drum 15 by a flexible band or belt 35 which passes around a lower sheave 36 adjacent the periphery of the drum 15 and another lower sheave 37 adjacent the left hand side of the frame 14. Then the belt extends upwardly as shown, to an upper sheave 38 and another upper sheave adjacent the periphery of the drum 16. The belt then extends downwardly between the sheaves as shown. The belt 35 may be driven frictionally, although if desired, any of its sheaves may be power driven. I have found it preferable to provide for the adjustment of sheave 36, which I do by making its bearings 40 slidable along ways 41. The bearings 40 are engaged by threaded rods 42 passing through a shoulder or abutment 43 on the frame of the device. The position of the rod will be adjustably maintained by nuts as shown.

Some means for tensioning the belt or band 35 is likewise desirable. I provide these means by making the bearing 44 of the sheave 37 slidable in ways 45 and by connecting the bearing 44 to the piston rod of the fluid cylinder 46 which exerts downward pressure on the bearings. Other tensioning means may, of course, be employed.

The guide 34 feeds the strip 11 into the space between the drum 15 and the belt 35 as shown. The belt causes the strip to conform to the surface of the drum 15 over approximately a quarter of its arc. Then as the belt 35 passes upwardly it leads the strip into a pinch between this belt and a second belt 47, located on the other side of the strip. The belt 47 is an endless belt passing over a lower sheave 48 and an upper sheave 49. For tensioning the belt 47, I provide a third sheave 50, the bearings 51 of which are mounted in ways 52 and can be adjusted by a threaded rod 53 held by nuts in a bracket 54.

The upward movement of the strip 11 is enforced by the belts 35 and 47, and the strip is led into the pinch between the belt 35 and the upper drum 16, and is caused to follow the periphery of the drum 16 for about a quarter of its arc. This arrangement greatly facilitates the initial threading of my apparatus as will be clear. At the time of the initial threading, the carriage 17 will preferably have been brought to its fullest left hand position in Fig. 1 so that the end of the strip passing around the drum 16 can readily be led over the supporting rollers 27, around the drum 19 on the car, over the rollers 9, the drum 20 and into pinch roll 21. Thence, it can be conducted to any treatment apparatus desired. It will be understood, of course, that there will be employed, in connection with such treatment apparatus, suitable means for feeding the strip against the resistance of the looper and particularly against the force of the carriage 17 tending to take up the strip, where a continuous force is applied to the carriage.

The carriage may be driven in any of a number of ways. It may, for example, be attached to a cable passing over a sheave at the end of the trackway, and bearing weights. The carriage may likewise be moved by a power operated winch and a cable. The carriage may be hydraulically operated. I prefer, however, to drive the carriage electrically and have illustrated in Figs. 4 and 5 an electric drive. Here a motor 55 is mounted on the frame of the carriage. It may be provided, if desired, with a gear box 56. The power shaft of the motor assembly may be connected with the flanged wheels 18 or their axles by chain and sprocket drives 57 and 58. The motor may be connected to power lines (through suitable brushes riding on live rails or by other means) in such a way as to tend at all times to drive the carriage 17 to the right in the several figures, the motor being capable of reverse rotation when the taking up of the stored strip moves the carriage 17 to the left against the force of the motor. It is also possible to provide a controller for the motor, such that either automatically or by hand, power to the motor may be shut off during those intervals when the carriage is drawn to the left.

Figure 4:
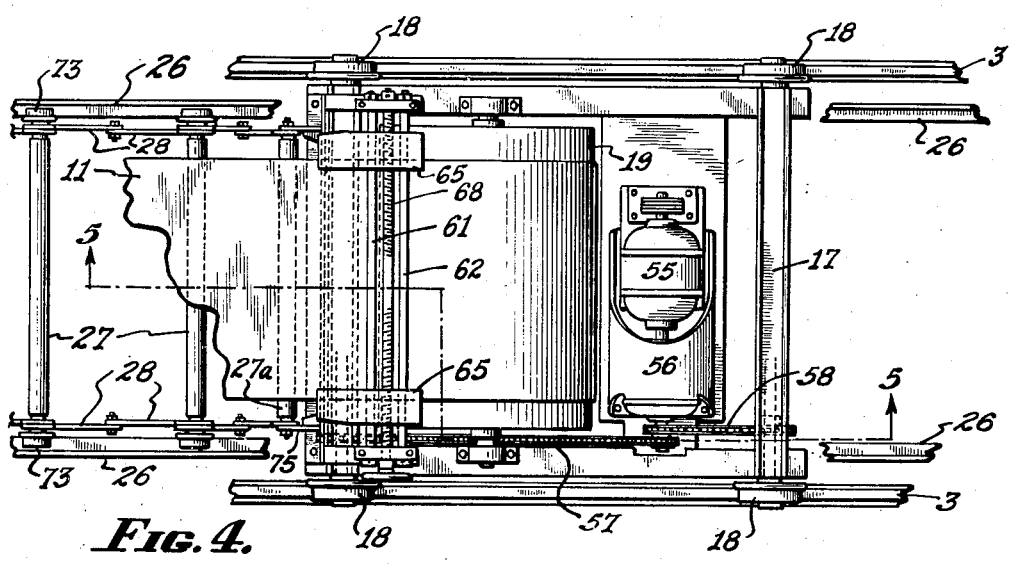
Fig. 4 is a plan view of the traveling carriage or car.
Figure 5:
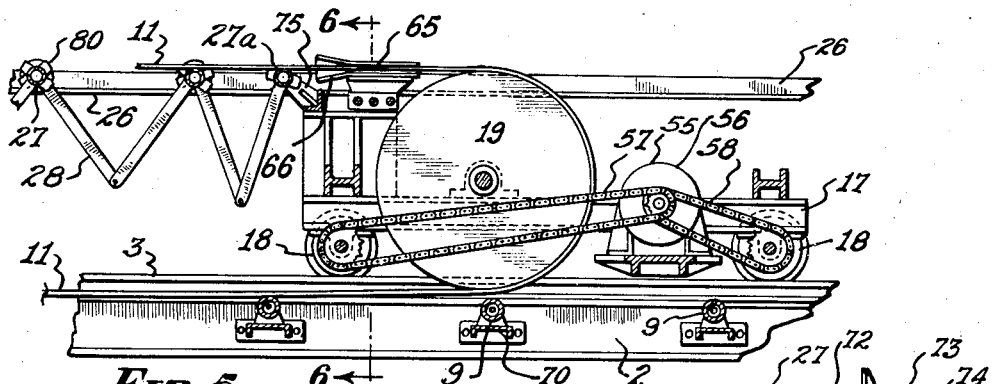
Fig. 5 is a sectional view of the carriage, taken along the line 5—5 of Fig. 4.
Figures 6, 7, 8, 9:
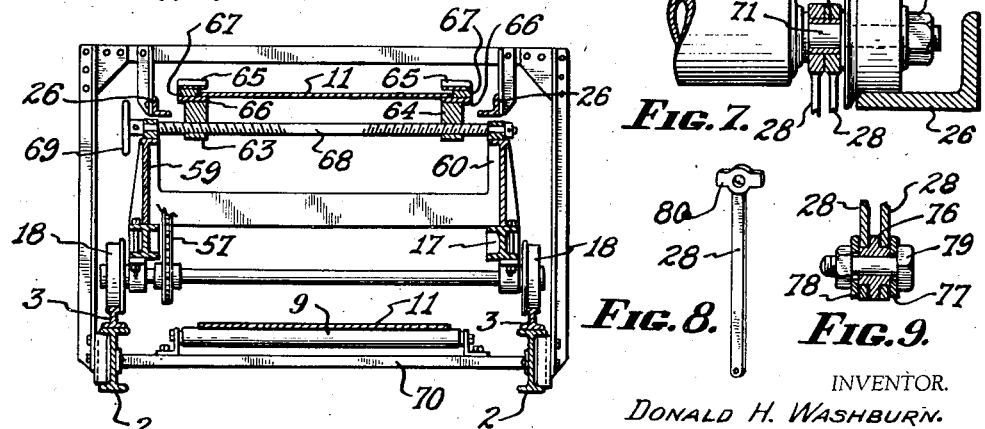
Fig. 6 is a sectional view taken along the lines 6—6 of Fig. 5 and showing a guide means and its adjustment.
Fig. 7 is a view of the end of a supporting roll with parts in section.
Fig. 8 is a perspective view of one of the spacing arms.
Fig. 9 is a sectional view of the juncture of the arms at a point remote from the supporting rollers.

The carriage is preferably provided with guide means to make certain that the strip does not ride off the ends of the drum 19. I have found that guide means located at 34 in Fig. 3 and operating on the strip as it enters the looper, together with guide means located on the carriage, will be sufficient in my apparatus to keep the various portions of the loop on the supporting rollers and drums, substantially irrespective of the length of the looper, and in spite of very considerable camber or lack of flatness in the strip. Where the apparatus must be used for looping strip materials of various widths, the guide means should be made adjustable. Referring to Figs. 4, 5 and 6, I mount on the frame of the carriage upright standards 59 and 60. Between these standards, I place a pair of rods 61 and 62. Supporting means 63 and 64, for the guides proper are slidably journalled on these rods. The guides themselves comprise upper and lower guide members 65 and 66 separated by a spacer 67. A shaft 68 bearing right and left hand threads is journalled for rotation on the standards 59 and 60, but is so mounted as to be kept from endwise movement. The shaft may be provided with a hand wheel 69 or other means for rotating it. The guide supports 63 and 64 are threaded to engage the respective threaded portions of the shaft 68. Thus a rotation of the shaft in one direction or the other will cause the guides to move toward or away from each other.

It will be understood that a cat-walk (not shown) will be provided adjacent the track supporting frame 2 so that the operator can get at the carriage and the various supporting rolls when required.

I have shown in more detail in Figs. 5 and 6, the mounting of the lower supporting rollers 9 on the frame members 2 or on beams 70 extending therebetween.

The upper supporting rolls 27, as shown in Fig. 7, preferably comprise a cylindrical shell mounted by means of ball bearings or other suitable bearings on a rod or shaft 71. At the ends of the rollers a bearing sleeve 72 may be slipped over the shaft 71. On this sleeve I mount a pair of the arms 28. The flanged wheel 73 is next placed on the shaft 71 and may be retained by a nut 74 engaging a threaded end of the shaft. The flanged wheels 73 ride on the upper track members 26 which, as shown, may be of angle irons.

The end roller of the group, i. e., the roller nearest the carriage, and shown at 27a in Fig. 5 is attached to the carriage by means of brackets 75. These brackets, as to this roller, take the place of one of the arms 28, as will readily be understood; and they cause the end roller 27a to move with the carriage. The other rollers are respectively interconnected by the arms 28, which arms at their outer ends are pivoted together as shown in Fig. 9. This may be done by providing a bearing member 76, which is formed with a central separator or washer and endwise extensions to engage in perforations in the ends of the arms 28. Washers 77 and 78 are placed at the ends of the assembly and a bolt 79 is passed through the bearing member 76 and the washers to complete the assembly.

The ends of the arms 28 which are attached to the rollers 27 are preferably formed with cross-heads 80. These cross-heads give the arms a relatively broad bearing on each other where they are attached to the rollers 27. Thus they help to prevent cocking of the rollers to such degree as would permit the flanged wheels to ride off the tracks 26. Also because the cross-heads on the ends of the arms 28 are of greater length than the diameter of the rolls 27, they prevent the rolls from contacting when the carriage moves to the left in the several figures. Thus, each roller is at all times left free to rotate on its antifrictional supports.

As will be clear from the several figures, the arms 28 serve to maintain and enforce such an interspacing of the upper supporting rollers 27 as will prevent a sag in the upper length of the loop, in spite of movement of the carriage. As the carriage moves to the left, the arms will fold. The supporting rollers 27 located furthest to the right will approach each other as far as permitted by the cross-heads 80. The action will usually be progressive from one end of the trackway to the other. However, as the carriage moves to the right in the several figures, the supporting rollers 27 will progressively be pulled further and further apart. Their movement is nevertheless limited by the arms 28 so that the strip is not left without support at any point. All of the rollers 27 are attached together as shown. The roller 27a at the right hand end of the system has been described as attached to the carriage 17. The roller 27b at the left hand end of the system (Fig. 3) is attached to the upper trackway 26 or to the frame 14 in such a way that it cannot move.

An additional adjustment useful in maintaining the strip in the loop over the lower supporting rollers 9 is illustrated in Figure 1. Here I have shown the bearings 81 of the drum 20 mounted in ways 82 and provided with a threaded rod 83, which threaded rod engages the ways also. A sprocket 84 on the end of this rod may be provided with a pull chain 85 by means of which the rod may be rotated by an operator standing on the floor 1. By these means any cocking of the drum 20 may be corrected and the strip 11 caused to move in a straight line.

Modifications may be made in my invention without departing from the spirit of it. Having thus described my invention what I claim as new and desire to secure by Letters Patent is:

1. In a looper device for permitting continuous movement of strip from an intermittently feeding source, means for supplying strip intermittently, means for moving strip continuously located near the first mentioned means, a drum movable with respect to the aforementioned means for taking up strip in a two sided loop disposed at a substantial angle to the vertical, and means for supporting at least one side of said loop, said means comprising a trackway, a group of rotatable supporting rollers translatably mounted on said trackway for movement therealong and means for preventing said supporting rollers from moving away from each other more than a predetermined distance during their translation along said trackway and as the said drum moves, said last mentioned means comprising linked arms attached to the ends of said movable rollers and interconnecting said rollers, one of said supporting rollers being connected with means stationary with respect to the first mentioned means, and another of said movable rollers at the other end of the group thereof having means to enforce its movement with said drum.

2. Apparatus as claimed in claim 1 in which the ends of adjacent movable rollers are connected together by a pair of arms, each such arm being pivoted at one end to one of the rollers, and the two arms at their other ends being pivoted together.

3. Apparatus as claimed in claim 1 in which the ends of adjacent movable rollers are connected together by a pair of arms, each such arm being pivoted at one end to one of the rollers, and the two arms at their other ends being pivoted together, said arms having at their ends which are pivoted to the rollers, enlarged heads of a dimension greater than the diameter of the said rollers, whereby said heads prevent said rollers from contacting each other.

4. Apparatus as claimed in claim 1 in which the ends of adjacent movable rollers are connected together by a pair of arms, each such arm being pivoted at one end to one of the rollers, and the two arms at their other ends being pivoted together, said arms having at their ends which are pivoted to the rollers, enlarged heads of a dimension greater than the diameter of said rollers, whereby said heads prevent said rollers from contacting each other, said heads having relatively broad bearings on each other whereby to prevent cocking of the rollers.

5. Apparatus as claimed in claim 1 in which the ends of adjacent movable rollers are connected together by a pair of arms, each such arm being pivoted at one end to one of the rollers, and the two arms at their other ends being pivoted together, and having a second trackway, a car movable along said trackway and bearing said movable drum, supporting rollers for the other leg of said loop located adjacent said second trackway but in such position as to permit the passage of said car thereover, and means for urging said car in a direction to elongate said loop.

6. Apparatus as claimed in claim 1 in which the ends of adjacent movable rollers are connected together by a pair of arms, each such arm being pivoted at one end to one of the rollers, and the two arms at their other ends being pivoted together, and having a second trackway, a car movable along said trackway and bearing said movable drum, supporting rollers for the other leg of said loop located adjacent said second trackway but in such position as to permit the passage of said car thereover, means for urging said car in a direction to elongate said loop, and guide means for said strip effective at said first mentioned means and effective at said car.

7. Apparatus as claimed in claim 1 in which the ends of adjacent movable rollers are connected together by a pair of arms, each such arm being pivoted at one end to one of the rollers, and the two arms at their other ends being pivoted together, and having a second trackway, a car movable along said trackway and bearing said movable drum, supporting rollers for the other leg of said loop located adjacent said second trackway but in such position as to permit the passage of said car thereover, and means for urging said car in a direction to elongate said loop, said first and second trackways being supported sufficiently above a floor to permit treatment apparatus to be located therebeneath.

8. Apparatus as claimed in claim 1 in which the ends of adjacent movable rollers are connected together by a pair of arms, each such arm being pivoted at one end to one of the rollers, and the two arms at their other ends being pivoted together, and having a second trackway, a car movable along said trackway and bearing said movable drum, supporting rollers for the other leg of said loop located adjacent said second trackway but in such position as to permit the passage of said car thereover, means for urging said car in a direction to elongate said loop, said first and second trackways being supported sufficiently above a floor to permit treatment apparatus to be located therebeneath, said first mentioned means comprising a pair of drums, one located above the other, and means for carrying a strip around the first drum, upwardly to the second drum and around the second drum.

9. Apparatus as claimed in claim 1 in which the ends of adjacent movable rollers are connected together by a pair of arms, each such arm being pivoted at one end to one of the rollers, and the two arms at their other ends being pivoted together, and having a second trackway, a car movable along said trackway and bearing said movable drum, supporting rollers for the other leg of said loop located adjacent said second trackway but in such position as to permit the passage of said car thereover, means for urging said car in a direction to elongate said loop, said first and second trackways being supported sufficiently above a floor or permit treatment apparatus to be located therebeneath and said first mentioned means comprising a pair of drums, one located above the other and means for carrying a strip around the first drum, upwardly to the second drum and around the second drum, said means comprising a pair of endless belts, sheaves over which said belts run and means for maintaining tension in said belts.

10. Apparatus for use with means for decoiling strip material, means for attaching strips end to end, and clamping means for strip, said apparatus including a looper comprising an end standard, means for carrying strip in said end standard to an elevated position, a pair of vertically interspaced trackways, a car carrying a drum movable on one of said trackways and a pay out drum located near the standard and adjacent one of the trackways, one of the trackways being provided with a series of supporting rollers so located as not to interfere with the movements of said car, the other of said trackways bearing a plurality of movable supporting rollers mounted by means of wheels thereon, a series of arms interconnecting said supporting rollers and pivoted together so that said rollers may be moved toward each other and away from each other up to but not beyond a predetermined distance, a connection between the first roller of the series and the said standard and a connection between the last roller of the series and said car, and means for urging said car away from said standard.

11. In a looper device for permitting continuous movement of strip from an intermittently feeding source, means for supplying strip intermittently, means for moving strip continuously located near the first mentioned means, a drum movable with respect to the aforementioned means, for taking up strip in a two sided loop disposed at a substantial angle to the vertical, and means for supporting at least one side of said loop, said means comprising a trackway, rotatable supporting roller means translatably mounted on said trackway for movement therealong, one terminal roller being fixed relative to the first mentioned means and the other terminal roller being movable with said drum, and a limiting connection between the ends of adjacent rollers for preventing said rollers from moving away from each other more than a predetermined distance during their translation along said trackway as the said drum moves.

12. In a looper device for permitting continuous movement of strip from an intermittently feeding source, means for supplying strip intermittently, means for moving strip continuously located near the first mentioned means, a drum movable with respect to the aforementioned means, for taking up strip in a two sided loop disposed at a substantial angle to the vertical, and means for supporting at least one side of said loop, said means comprising a trackway, rotatable supporting roller means translatably mounted on said trackway for movement therealong, one terminal roller being fixed relative to the first mentioned means and the other terminal roller being movable with said drum, and a limiting connection between the ends of adjacent rollers for preventing said rollers from moving away from each other more than a predetermined distance during their translation along said trackway as the said drum moves, said limiting connection comprising linked arms interconnecting said rollers.

DONALD H. WASHBURN.